United States Patent [19]

Wreede

[11] Patent Number: 4,953,923
[45] Date of Patent: Sep. 4, 1990

[54] SYSTEM FOR REDUCING NOISE HOLOGRAMS

[75] Inventor: John E. Wreede, Monrovia, Calif.
[73] Assignee: Hughes Aircraft Company, Los Angeles, Calif.
[21] Appl. No.: 226,593
[22] Filed: Aug. 1, 1988
[51] Int. Cl.$^5$ .............................................. G03H 1/04
[52] U.S. Cl. ................................... 350/3.61; 350/3.6; 350/3.83; 430/1
[58] Field of Search ..................... 350/3.6, 3.61, 3.65, 350/3.67, 3.83; 430/1, 2

[56] References Cited
U.S. PATENT DOCUMENTS

| | | | |
|---|---|---|---|
| 3,601,017 | 8/1971 | Glatzer et al. | 350/3.61 |
| 4,456,328 | 6/1984 | Arns et al. | 350/3.6 |
| 4,458,977 | 7/1984 | Arns et al. | 350/3.6 |
| 4,458,978 | 7/1984 | Arns et al. | 350/3.83 |

*Primary Examiner*—Bruce Y. Arnold
*Assistant Examiner*—Martin Lerner
*Attorney, Agent, or Firm*—Leonard A. Alkov; Wanda K. Denson-Low

[57] ABSTRACT

A hologram recording assembly includes a transparent, absorbent member supported on a substrate. The transparent member is positioned to be directly incident to an exposure beam. The transparent member is out of moisture equilibrium during an exposure time. Consequently, the transparent member increases or decreases in thickness depending on a moisture difference between it and the environment. As the thickness changes, a phase shift in the light reflections within the recording assembly blurs spurious holograms while leaving the desired hologram intact.

20 Claims, 2 Drawing Sheets

SYSTEM FOR REDUCING NOISE HOLOGRAMS

BACKGROUND OF THE INVENTION

1. Field of the Invention

This invention generally relates to a system and method for reducing noise holograms and, more specifically, to an improved system and method for inducing phase shifts of reflective light during construction of the primary hologram.

2. Description of Prior Art

High quality holographic optical elements are used in defraction optics display systems, such as head up displays (HUDs), for advanced aircraft, helmet mounted displays, laser protective devices, narrow band reflective filters, and holographic high gain screens for simulators. These are only a few of the many uses of high quality reflective holograms.

One of the critical problems in defraction optic display systems utilizing a replicated hologram has been a degradation of the holographic images as a result of the effects of spurious reflection in transmission hologram recordings that are frequently generated during the holographic replication process. Perhaps the most damaging spurious noise holograms are generated by reflections from surfaces which are interfaces of materials of different indexes of refraction, such as air/glass interfaces of the transparent surfaces of a recording cover plate, a hologram substrate, the recording medium itself, and optical elements used to generate the recording beams. These reflections can combine with the primary holographic beams at the recording film to form spurious reflection holograms, when the beams are in the opposite direction, and spurious transmission holograms when the beams are in the same direction. A subsequent display system using this hologram will be degraded by ghost images from the spurious reflection hologram recordings, and rainbow-like flair patterns from the spurious transmission hologram recordings.

The prior art has attempted to solve these problems in several different ways. A simple approach has been to form the hologram with energy beams that strike the recording material surfaces at Brewster's angle, at which reflections are at a minimum. This method has very limited application because in general the incident angle is set by the desired holographic function, and is not a variable that one can select at will.

Another approach has been to reduce the spurious reflections by attempting to match the indexes of refraction at the different surface interfaces with an index matching fluid, such as a mineral oil. The entire recording module is immersed in an index of refraction matching oil bath. The shape of the container is then designed so that surface reflections are directed away from the recording material. For many optical configurations, such a shape does not exist. Furthermore, the phase instability of the optical paths in oil degrade the desired hologram. Also, the problems of stabilizing the oil after each plate change, the need to frequently clean the oil of impurities, and the delays in handling the volume of oil needed all make this method unsuitable for production.

More sophisticated approaches are disclosed in U.S. Pat. Nos. 4,458,977, 4,458,978, and 4,456,328, in which spurious holograms caused by glass/air interfaces are eliminated by moving an outside cover plate to change the phase of the reflected rays relative to the primary beams during the recording period. Thereby, spurious holograms are not formed. For these approaches that use a moving cover plate, the rate of movement or phase change is a function of the exposure time which depends on the sensitivity of the recording medium. The total movement must provide a phase change of at least one half wavelength in the reflected spurious hologram beams to nullify or "smear out" any spurious interference patterns that would otherwise be recorded. While those systems have advantages over the prior art, they still have certain disadvantages. For example, the drivers to move the cover plate take time to adjust, calibrate, and test. The complete apparatus is complex to set up, needs long stabilization time, and has many modes of potential failure to decrease yield.

Another attempt to suppress spurious holograms is disclosed in U.S. Pat. No. 3,601,017. Therein, an immersion liquid is applied to either the surface of the recording medium or the surface of a transparent support member, which surface is remote from the direction of light incidence. The thickness of the immersion agent layer is varied over time during an exposure by evaporation or, when it is not so readily evaporated, by generating acoustic or surface waves which, during their reflection, directionally modulate the wave field in the liquid. Preferably, the transparent immersion liquid is O-xylene. This system also has drawbacks, including the fact that the evaporating liquid is not a good optical surface. Further, the variation in thickness would not appear to be highly regulated, particularly when using generated waves.

A need still exists in the technology to provide an improved system and method for producing a high quality hologram that has minimal spurious holograms and at the same time can be produced in an economical and efficient manner.

SUMMARY OF THE INVENTION

The present invention seeks to overcome the disadvantages found in the prior art by providing a recording assembly that includes a mirror positioned at the bottom of the recording assembly, and a reservoir of index matching fluid adjacent to a reflective surface of the mirror. A recording medium is then placed on a side of the reservoir opposite the mirror. A substrate supports the recording medium, as well as an absorbent, transparent member on a side of the substrate opposite the recording medium. The absorbent member is out of moisture equilibrium with the surrounding environment. Thereby, the absorbent, transparent member can either absorb moisture from the environment or release it into the environment, depending upon the moisture differential between the transparent member and the environment. During the time that the absorbent, transparent member is either absorbing or releasing moisture, preferably at a constant rate, the recording assembly can be recording an interference pattern in the recording medium.

By steadily increasing or decreasing the thickness of the absorbent member, the interference fringes or patterns which constitute the spurious holograms are blurred to an extent sufficient to practically remove the interference caused by the spurious hologram. At the same time, the desired hologram is not significantly blurred and remains sufficiently clear for the needed purpose. Specifically, the blurring is caused by the motion of the interference pattern in space as a result of one reflection surface moving. The process of blurring the spurious holograms continues during the recording time period and, during such time, the rate of expansion or contraction of the absorbent member remains substantially constant.

The objects of the present invention can best be seen from an examination of the specification, claims, and drawings hereto.

DESCRIPTION OF THE PREFERRED EMBODIMENTS

The following description is provided to enable any person skilled in the art to which the present invention pertains, or with which it is most nearly connected, to make and use the same, and sets forth the best mode contemplated by the inventor of carrying out his invention. Various modifications, however, will remain readily apparent to those skilled in the art, since the generic principles of the present invention have been defined herein specifically to provide an improved system for reducing noise holograms.

Figure 1:
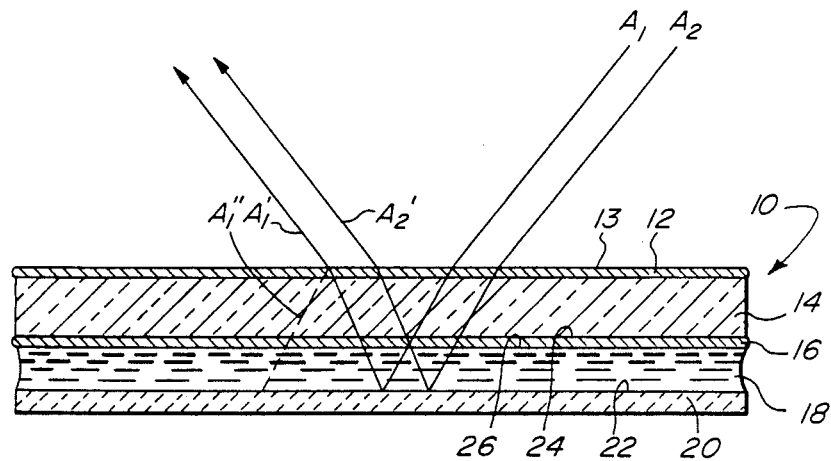
FIG. 1 depicts the recording of a hologram according to the present invention wherein an absorbent or transparent member in the recording assembly is static.

FIG. 1 is a side view of a recording assembly 10 which is constructed according to the present invention. While the present embodiment shows the recording assembly 10 with a flat configuration, it should be understood that other configurations, such as a curved one, are contemplated. The recording assembly 10 is a module that includes at the bottommost portion thereof, when viewed from FIG. 1, a reflective element or mirror 20. The mirror 20 has at its top surface thereof, when viewed from FIG. 1, a reflective surface 22 that serves to reflect light rays which are designated as $A_1$, $A_2$. A reservoir of an index matching fluid 18 is disposed immediately above and in contact with the reflective surface 22. The fluid 18 can be of any suitable and well-known matching fluid commonly used in holographic recording modules, such as xylene or mineral oil. For example, the fluid 18 may be an optical grade mineral oil or a microscope immersion oil. In this particular embodiment, with the recording assembly having an overall thickness of about 0.50 to 0.75 inches, the reservoir of index matching fluid 18 has a thickness of approximately 0.20 to 0.25 inches. With a thickness of less than 0.01 inches for the fluid 18, controlled recording is difficult. More than 0.25 inches may present problems of index variations.

A recording medium or film 16 is positioned immediately adjacent a top side of the reservoir of index matching fluid 18. The recording medium 16 includes a top surface 24 and a bottom surface 26, and is made of any suitable, well-known recording film material for holograms. In this particular embodiment, the recording material 16 is made of dichromated gelatin. The thickness of the recording medium 16 in this particular embodiment is approximately 0.001 inches, but can vary.

A substrate 14 supports the recording medium 16 at the upper surface 24 thereof. While the substrate 14 is made of glass in this particular embodiment, it can be appreciated by those skilled in the art that other materials, such as semiconductor materials, can also be used, and which are dependent upon the wavelength of the radiation. The thickness of the substrate 14 is approximately 0.25 inches in this embodiment, but can vary.

An absorbent or transparent member 12 is supported on a side of the substrate 14 which is opposite the recording medium 16. The absorbent member 12 is, during the recording period, out of moisture equilibrium with a surrounding environment 28. In this particular embodiment, the absorbent member 12 is made of undichromated gelatin and has a thickness of about 10 to 50 micrometers. The present invention contemplates that the absorbent member 12 may not be transparent and may contain a dye therein, such as very fine carbon that is water soluble and miscible with the gelatin (or other material) in a solvent or a wavelength dependent dye such as methyl orange, which might be used for a green-blue exposure range. With a dye, spurious reflections are decreased from absorption by the dye material, which reflections particularly occur at an air interface 13 of the member 12.

In the event that a dye is in the absorbent member 12, a greater reduction of noise or spurious holograms is achieved than without a dye. This is due to the following. Primary light beams, such as $A_1$, $A_2$ (FIG. 1) go through the member 12 once, and may then exit the assembly as beams $A_1'$, $A_2'$. In contrast, a noise beam, such as $A_1''$ (FIG. 1), effectively goes through the member 12 three times. If, for example, absorption loss from the recording medium 16 and mirror 20 are ignored, and a reflection factor at the surface 13 of about 4% is assumed, the noise beam $A_1''$ will be about 3.2% of the primary beam $A_1$ without a dye. With the addition of a dye, the primary beam $A_1$ may need to be twice as bright to overcome the 50% absorption factor of the dye, but then the noise beam $A_1''$ is then reduced to about 0.8% of the primary beam at the medium 16.

As is known in the art, a gelatin film such as the absorbent member 12 can shrink, and the shrinkage appears to occur in four distinct mechanisms. One mechanism is a loss of water. Shrinkage of the gelatin due to loss of water is nearly equivalent to the volume of water lost. The water can occur as interstitial or as fairly loosely bound water. In either case, the bulk of the water comes off fairly rapidly (less than one day at 60° C.). As can be appreciated, because of the natural origin of the basic gelatin material, the chemical composition and structure of the gelatin can vary from one sample to another. Accordingly, the rate at which a gelatin layer (i.e., the absorbent member 12) can lose water, or even absorb water, can differ from one type of gelatin to another.

Figure 2:
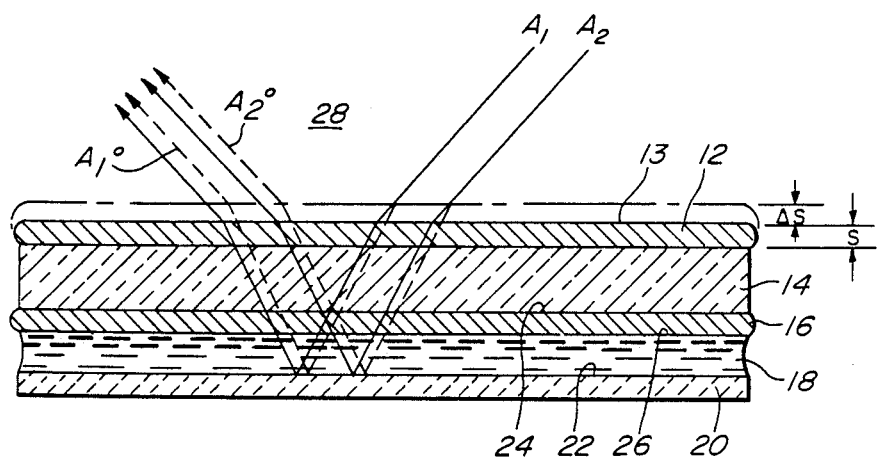
FIG. 2 discloses a recording assembly according to the present invention wherein an absorbent member has been reduced or increased in thickness during the recording of a hologram.

FIG. 2 depicts the manner in which the present invention takes advantage of the ability of gelatin to absorb and lose water. The absorbent member 12, which is made of gelatin, is shown in hatched lines having a thickness S. The thickness S is representative of the thickness of the absorbent member 12 in a static state. In such a state, the absorbent member 12 is neither absorbing nor losing moisture in a net amount with respect to the environment 28. Consequently, the thickness of the absorbent member 12 remains stable or static.

However, when the absorbent member 12 is out of moisture equilibrium with the environment 28, the absorbent member 12 may swell by the absorption of water and its thickness would increase by an amount designated by $\Delta S$. The change in thickness of $\Delta S$ is represented in FIG. 2 by the phantom lines above the cross-hatched lines that represent the absorbent member 12 in a static state. Thus, as the absorbent member 12 absorbs water and leaves its static state, it increases in thickness by an amount $\Delta S$.

On the other hand, when the absorbent member 12 loses water to the environment, the absorbent member 12 will be represented by the aggregate of the phantom lines and the cross-hatched lines in FIG. 2. Thus, when the absorbent member loses water to the environment 28, the absorbent member becomes reduced in thickness by an amount represented by $\Delta S$. When the absorbent member 12 finally reaches moisture equilibrium, it will then be in the static state which is represented by the cross-hatched lines.

The present invention utilizes the changes in thickness through a distance $\Delta S$ to produce a phase shift of a light moving through the recording assembly 10. In particular, a phase shift of the light passing through the recording assembly 10 in an amount of approximately one-half wavelength will substantially eliminate the otherwise present spurious holograms, while leaving the desired hologram with sufficient clarity. The phase shift is depicted in FIG. 2 by rays $A_1°$, $A_2°$. (The production of phase shift and consequent blurring of noise holograms in similar contexts, which is applicable herein, is generally described in U.S. Pat. Nos. 4,458,977, 4,458,978, and 4,456,328.) With the above size parameters in this particular embodiment, a change in thickness of about 1.5% will produce the needed phase shift. The change may range from about 0.5% for thick members and to about 2.5% for thin members.

Figure 3A:
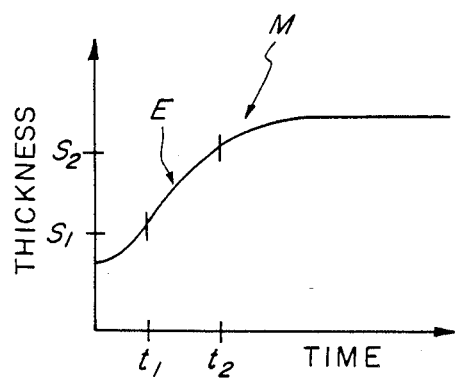
FIG. 3(a) is a graph of increasing thickness of the absorbent member over time according to the present invention.
Figure 3B:
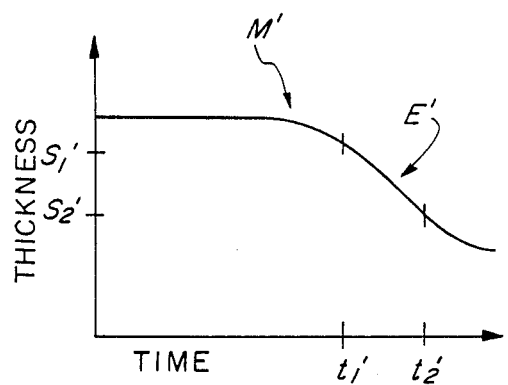
FIG. 3(b) is a graph of decreasing thickness of the absorbent member over time according to the present invention.

FIGS. 3(a), (b) graphically illustrate, for purposes of examples, changes in a thickness S in an absorbent member 12. The figures only seek to depict what might be considered model situations. In FIG. 3(a), a moisture curve M is shown for an absorbent member 12 absorbing moisture. FIG. 3(b) shows another moisture curve M', which is representative of an absorbent member 12 shrinking as it loses moisture.

In FIG. 3(a) between a time $t_1$ and a time $t_2$, the thickness of the absorbent member 12 increases from a thickness $S_1$ to a thickness $S_2$ in a substantially linear fashion. This substantially linear occurrence on a portion of the moisture curve M is denoted by the reference letter E. To the left side of the curve E, when viewed from FIG. 3(a) the absorbent member 12 is just beginning to increase in thickness, and thus the curve is significantly less linear than the portion E. Similarly, the portion of the curve M on the right side of the curve E, when viewed from FIG. 3(a), represents a time during which the absorbent member 12 is becoming saturated or in moisture equilibrium with the environment 28. Again, the right side of the curve M is significantly less linear than the portion E.

Referring to FIG. 3(b), between a time $t_1'$ and a time $t_2'$, a thickness of an absorbent member 12 decreases from a thickness $S_1'$ to a thickness $S_2'$. This represents a substantially linear decrease in thickness over time, and is indicated as E' in a portion of the moisture curve M'. As in the case shown in FIG. 3(a), the portions of the moisture curve M' on either side of the portion E' represent nonlinear changes of the thickness S over time.

In either instance represented by FIGS. 3(a), (b), the exposure of the recording medium 16 is limited to the time represented by the curves E, E', respectively. During those time periods, since the thickness S of the absorbent member 12 is linearly changing over time, the phase shift of the reflections in the recording assembly 10 is generally linear over time. Consequently, the blurring or smearing out of the spurious holograms is substantially linear over time. If, however, the exposure were to occur outside of the portions E, E', the thickness change would not be linear, and thus the phase shift would not be linear. In turn, this would cause the spurious holograms to be unevenly blurred or smeared out, and thus actually result in the creation of spurious holograms.

As was noted above, FIGS. 3(a), (b) are merely illustrations of what might be considered a model absorbent member 12. Experimentally, a 300 bloom strength, porkskin type A gelatin was used as the absorbent member 12. Test results indicated that an increase in relative humidity from 0 to 5% produces a swelling rate that is nearly linear over a 30-minute period of time. This is generally equivalent to 0.05 wavelengths of argon laser light (5145 Å) per minute when the absorbent member 12 is 50 microns thick. An increase of relative humidity from 0 to 22% produced a swelling rate of approximately 0.22 wavelengths per minute for the same member 12. A decrease in relative humidity of this particular member did not give a substantially linear shrinkage rate from 22 to 0% relative humidity.

It can be appreciated by those skilled in the art that the material out of which the absorbent member 12 is constructed can be selected to provide a greater tendency or lesser tendency to absorb and lose moisture. Such a characteristic may be important for the particular recording assembly into which the absorbent member 12 is incorporated, and the length of time over which the exposure is expected to occur. With very short exposure times, it may be necessary to utilize an absorbent member 12 that quickly absorbs or loses moisture. On the other hand, with a long exposure time, it may be necessary to utilize a different material for the absorbent member 12 that more slowly absorbs or loses moisture.

Figure 4:
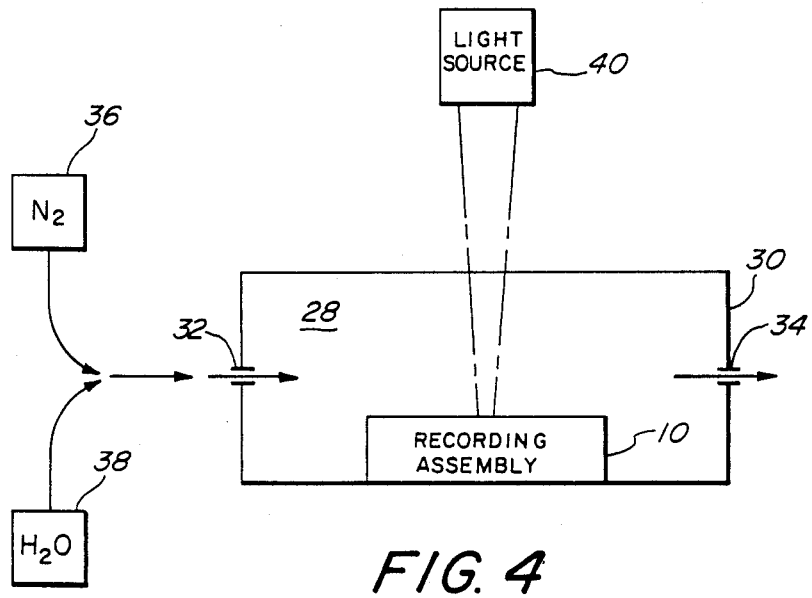
FIG. 4 depicts an exposure system for the hologram assembly according to the present invention.

In operation, and as shown in FIG. 4, a light source 40 produces the light rays $A_1$, $A_2$ which are shown in FIGS. 1, 2. The light rays impinge upon the recording assembly 10 which is placed in a sealed housing 30. The housing 30 controls the relative humidity of the environment 28 surrounding the recording assembly 10. In this particular embodiment, a nitrogen gas source 36 can introduce nitrogen through an inlet 32 of the housing 30. The nitrogen gas is allowed to pass over the recording assembly 10 and thereby draw moisture out of the environment 28 through an outlet 34. As moisture is drawn out of the housing 30, a moisture gradient is set up such that the absorbent member 12 tends to lose moisture to the environment 28. When the absorbent member 12 must absorb moisture, a moisture source 38 can pump moisture through the inlet 32 and into the environment 28 to again create a moisture gradient. With a higher relative moisture in the environment 28, the absorbent member 12 can absorb moisture.

The result is that the absorbent member 12 in the recording assembly 10 can be forced to absorb water or lose water, as desired. In so doing, the absorbent member 12 will change in thickness in a substantially linear relationship over a specific period of time, and during that time the exposure of the recording medium 16 can occur. The linear change in thickness produces a linear phase shift in reflections in the recording assembly 10 and substantially blurs out spurious holograms while leaving the desired hologram intact.

The above only represents particular embodiments of the present invention, and it is contemplated that various modifications to the above can be effected but nevertheless come within the scope of the present invention as defined by the claims.

What is claimed is:

1. A system for recording a hologram with an exposure beam, comprising:
   a substrate transparent to said exposure beam;
   a recording medium positioned on said substrate;
   an absorbent member means having a thickness and being positioned relative to said exposure beam and fixed on a surface of said substrate for absorbing and releasing fluid respectively from and to a surrounding environment and for varying said thickness in response to a change in fluid content thereof during an exposure time of said recording medium.

2. The improvement of claim 1 wherein said exposure time is defined from a period $t_1$ through $t_2$, and at $t_1$ said absorbent member is out of fluid equilibrium with a surrounding environment.

3. The improvement of claim 1 wherein the thickness of said absorbent member increases during said exposure time.

4. The improvement of claim 1 wherein the thickness of said absorbent member decreases during said exposure time.

5. The improvement of claim 1 wherein said recording medium and said absorbent member are on oppositely facing surfaces of said substrate.

6. An improved system for recording a hologarm with a recording medium positioned on a substrate transparent to an exposure beam and for reducing spurious noise during recording, comprising:
   (a) an absorbent layer means having a thickness and positioned on a surface of the substrate directly incident to said exposure beam for absorbing and releasing fluid respectively from and to a surrounding environment and for varying said thickness in response to a change in fluid content thereof; and
   means for communicating a fluid to said absorbent material to alter the thickness of said layer means during an exposure time of said recording medium.

7. The system for recording a hologram according to claim 6 wherein the thickness of said absorbent material is increased during said exposure time.

8. The system for recording a hologram according to claim 6 wherein the thickness of said absorbent material is reduced during said exposure time.

9. The system for recording a hologram according to claim 7 or 8 further including a reflection element positioned adjacent one surface of said substrate and adjacent the recording medium, said absorbent material being positioned on an oppositely facing surface of said substrate.

10. The sytem for recording a hologram according to claim 9 further including a dye means in said absorbent material for decreasing reflection of beams during said exposure time.

11. The hologram recording system of claim 6 wherein said means for communicating comprises:
   a housing means surrounding said recording medium, substrate and absorbent layer means; and
   fluid source means for introducing fluid into said housing means and removing fluid therefrom.

12. The hologram recording system of claim 11 wherein said fluid source means comprises:
   a gas source means for withdrawing moisture from said housing means; and
   moisture source means for inserting moisture into said environment.

13. The hologram recording system of claim 6 wherein said layer has first and second substantially parallel planar surfaces, and wherein said variation in thickness occurs by variation of the distance between the substantially parallel planes.

14. The hologram recording system of claim 13 wherein said layer comprises a gelatin.

15. The hologram system of claim 14 wherein said gelatin comprises a porkskin type A gelatin.

16. The hologram recording system of claim 6 wherein siad layer has first and second surfaces, each of said first and second surfaces having the same contour, and wherein siad variation in thickness occurs through substantially uniform variation of the distance between the respective contours.

17. A hologram recording system, comprising:
   first means for producing an exposure beam;
   a transparent substrate having a first side and an oppositely facing second side;
   an absorbent layer means on the first side of said substrate and having a thickenss for absorbing and releasing fluid respectively from and to a surrounding environment and for varying said thickenss in response to a change in fluid content thereof;
   a recording material on the second side of said substrate;
   second means for reflecting said exposure beam towards said recording material; and
   index matching means disposed intermediate said second means and said recording material.

18. The hologram recording system according to claim 12 wherein said substrate is made of glass.

19. The hologram recording system according to claim 18 wherein said absorbent member is made of gelatin.

20. The hologram recording system according to claim 19 wherein said recording material is dichromated gelatin.

* * * * *